United States Patent
Rong et al.

(10) Patent No.: US 10,972,159 B2
(45) Date of Patent: Apr. 6, 2021

(54) PRECODING CONFIGURATION METHOD, DEVICE, AND SYSTEM

(71) Applicant: Huawei Technologies Co., Ltd., Guangdong (CN)

(72) Inventors: Lu Rong, Shanghai (CN); Yong Liu, Shanghai (CN); Lu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 16/401,824

(22) Filed: May 2, 2019

(65) Prior Publication Data

US 2019/0260437 A1    Aug. 22, 2019

Related U.S. Application Data

(63) Continuation of application No. PCT/CN2017/090052, filed on Jun. 26, 2017.

(30) Foreign Application Priority Data

Nov. 3, 2016 (CN) .......................... 201610974339.0

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0413* (2013.01); *H04B 7/06* (2013.01);
(Continued)

(58) Field of Classification Search
CPC ...... H04B 7/0456; H04B 7/06; H04B 7/0639; H04B 7/0482; H04W 72/0453; H04L 41/0806
See application file for complete search history.

(56) References Cited

U.S. PATENT DOCUMENTS

2006/0146856 A1* 7/2006 Jung ................. H04L 5/0046
370/431
2009/0268602 A1* 10/2009 Han .................. H04W 56/001
370/208
(Continued)

FOREIGN PATENT DOCUMENTS

CN          102379091 A        3/2012

OTHER PUBLICATIONS

3GPP TS 36.213 V12.1.0 (Mar. 2014);3rd Generation Partnership Project;Technicai Specification Group Radio Access Network;Evolved Universal Terrestrial Radio Access (E-UTRA);Physical layer procedures(Release 12);total 186 pages.
(Continued)

*Primary Examiner* — Diane L Lo
*Assistant Examiner* — Abusayeed M Haque
(74) *Attorney, Agent, or Firm* — Leydig, Voit & Mayer, Ltd.

(57)    ABSTRACT

Embodiments of the present disclosure disclose a precoding configuration method, device, and system. The precoding configuration method includes: generating precoding configuration information, where the precoding configuration information is used to configure a width of a frequency band for same precoding; and sending the precoding configuration information. The embodiments of the present disclosure further provide a transmit end device, a receive end device, and the precoding configuration system. In the precoding configuration method provided in the embodiments of the present disclosure, the precoding configuration information is generated and sent, so that a receive end can determine, based on the precoding configuration information, the width of the frequency band for same precoding. In the prior art, the width of the frequency band for same precoding is determined based on only system bandwidth, while the width of the frequency band for same precoding can be
(Continued)

flexibly determined in the technical solutions provided in the embodiments of the present disclosure, so that requirements of a wireless communications system can be met in diversified scenarios, and system performance can be effectively optimized in different scenarios.

15 Claims, 5 Drawing Sheets

(51) Int. Cl.
   *H04L 12/24* (2006.01)
   *H04L 5/00* (2006.01)
   *H04W 72/04* (2009.01)
   *H04B 7/0413* (2017.01)

(52) U.S. Cl.
   CPC ......... *H04B 7/0639* (2013.01); *H04L 5/0051* (2013.01); *H04W 72/0453* (2013.01)

(56) References Cited

U.S. PATENT DOCUMENTS

| | | | | |
|---|---|---|---|---|
| 2011/0188465 | A1* | 8/2011 | Han | H04B 7/2628 370/329 |
| 2011/0222629 | A1* | 9/2011 | Lindh | H04B 7/0689 375/296 |
| 2012/0008587 | A1 | 1/2012 | Lee et al. | |
| 2012/0178463 | A1* | 7/2012 | Lin | H04W 48/20 455/450 |
| 2013/0155992 | A1* | 6/2013 | Yoon | H04L 5/0023 370/329 |
| 2013/0223402 | A1* | 8/2013 | Feng | H04L 5/0053 370/330 |
| 2013/0258886 | A1* | 10/2013 | Chen | H04B 7/084 370/252 |
| 2015/0263798 | A1 | 9/2015 | Ko et al. | |
| 2017/0026953 | A1* | 1/2017 | Wang | H04W 72/048 |
| 2017/0070273 | A1 | 3/2017 | Lee, II et al. | |
| 2017/0279504 | A1* | 9/2017 | Chen | H04B 7/0452 |
| 2018/0035429 | A1* | 2/2018 | Jiaqing | H04L 5/0053 |

OTHER PUBLICATIONS

"WF on Phase Continuity of DL/UL Precoding," 3GPP TSG RAN WG1 Meeting #86bis, Lisbon, Portugal, R1-1611037, XP051160483, pp. 1-2, 3rd Generation Partnership Project, Valbonne, France (Oct. 10-14, 2016).

"On PRB Bundling for NR," 3GPP TSG-RAN WG1 #86bis, Lisbon, Portugal, R1-1609771, XP051149801, pp. 1-4, 3rd Generation Partnership Project, Valbonne, France (Oct. 10-14, 2016).

* cited by examiner

400

500

PRECODING CONFIGURATION METHOD, DEVICE, AND SYSTEM

CROSS-REFERENCE TO RELATED APPLICATIONS

This application is a continuation of International Application No. PCT/CN2017/090052 filed on Jun. 26, 2017, which claims priority to Chinese Patent Application No. 201610974339.0 filed on Nov. 3, 2016. The disclosures of the aforementioned applications are hereby incorporated by reference in their entireties.

TECHNICAL FIELD

The present application relates to the field of communications technologies, and in particular, to a precoding configuration method, device, and system.

BACKGROUND

In a Multiple Input Multiple Output (MIMO) system, by using multi-antenna precoding at a data transmit end, system performance may be effectively improved. To support a receive end in demodulating data, the transmit end usually needs to perform corresponding precoding on a demodulation reference signal (DMRS), so that the receive end can estimate a precoded equivalent channel.

In a system based on orthogonal frequency division multiplexing (OFDM), data is transmitted on a plurality of subcarriers in frequency domain. To avoid excessively consuming resources, the DMRS is transmitted on all subcarriers for data transmission, but is transmitted on some subcarriers corresponding to the DMRS. Therefore, data on a plurality of continuous subcarriers may be precoded by sharing one corresponding DMRS.

Usually, a plurality of DMRSs in adjacent frequency domain may also use same precoding to improve channel estimation performance and reduce channel state information (CSI) feedback overheads. Data that uses same precoding and a corresponding DMRS of the data are usually located on continuous subcarriers.

In an existing Long Term Evolution (LTE) system, a precoding resource block group (PRG) is used to indicate a width of a frequency band for same precoding. The width of the frequency band for same precoding depends only on system bandwidth. Provided that the system bandwidth is determined, user equipment (UE) may determine, based on a convention of the LTE standard protocol, the width of the frequency band for same precoding.

In a 5G multi-scenario condition, the width of the frequency band for same precoding is determined based on only the system bandwidth, causing poor flexibility and difficulty in effectively optimizing system performance in different scenario conditions.

SUMMARY

To flexibly determine a width of a frequency band for same precoding and effectively optimize system performance in different scenario conditions, embodiments of the present disclosure provide a precoding configuration method, device, and system. The technical solutions are as follows:

According to a first aspect, a precoding configuration method is provided, where the method includes:

generating precoding configuration information, where the precoding configuration information is used to configure a width of a frequency band for same precoding; and sending the precoding configuration information.

In the precoding configuration method provided in the embodiments of the present disclosure, the precoding configuration information is generated and sent, so that a receive end device can determine, based on the precoding configuration information, the width of the frequency band for same precoding. In the prior art, the width of the frequency band for same precoding is determined based on only system bandwidth, while the width of the frequency band for same precoding can be flexibly determined in the technical solutions provided in the embodiments of the present disclosure, so that requirements of a wireless communications system can be met in diversified scenarios, and system performance can be effectively optimized in different scenarios.

In a possible design, the precoding configuration information includes a frequency bandwidth parameter, where the width of the frequency band for same precoding is equal to the frequency bandwidth parameter multiplied by reference frequency bandwidth.

The reference frequency bandwidth is equal to frequency bandwidth of a resource unit.

In a possible design, the precoding configuration information includes a width value of the frequency band for same precoding or an index of the width value.

In a possible design, the precoding configuration information includes an index of a width mapping rule, where the width mapping rule records a correspondence between system bandwidth and the width of the frequency band for same precoding.

In a possible design, the precoding configuration information includes a width update parameter, where the width update parameter is used to update a current width of the frequency band for same precoding.

According to a second aspect, a precoding configuration method is provided, where the method includes:

receiving precoding configuration information, where the precoding configuration information is used to configure a width of a frequency band for same precoding; and determining, based on the precoding configuration information, the width of the frequency band for same precoding.

In the precoding configuration method provided in the embodiments of the present disclosure, the precoding configuration information is received, so that a receive end device can determine, based on the precoding configuration information, the width of the frequency band for same precoding. In the prior art, the width of the frequency band for same precoding is determined based on only system bandwidth, while the width of the frequency band for same precoding can be flexibly determined in the technical solutions provided in the embodiments of the present disclosure, so that requirements of a wireless communications system can be met in diversified scenarios, and system performance can be effectively optimized in different scenarios.

In a possible design, the precoding configuration information includes a frequency bandwidth parameter; and the determining, based on the precoding configuration information, the width of the frequency band for same precoding includes that: the width of the frequency band for same precoding is equal to the frequency bandwidth parameter multiplied by reference frequency bandwidth.

The reference frequency bandwidth is equal to frequency bandwidth of a resource unit.

In a possible design, the precoding configuration information includes a width value of the frequency band for same precoding or an index of the width value; and the determining, based on the precoding configuration information, the width of the frequency band for same precoding includes: determining the width value of the frequency band for same precoding as the width of the frequency band for same precoding; or determining, based on a correspondence between an index of the width value of the frequency band for same precoding and the width value of the frequency band, the width of the frequency band for same precoding.

In a possible design, the precoding configuration information includes an index of a width mapping rule, where the width mapping rule of the frequency band for same precoding records a correspondence between system bandwidth and the width of the frequency band for same precoding; and the determining, based on the precoding configuration information, the width of the frequency band for same precoding includes: determining the width mapping rule based on the index of the width mapping rule, and then determining, based on the width mapping rule and the system bandwidth, the width of the frequency band for same precoding.

In a possible design, the precoding configuration information includes a width update parameter; and the determining, based on the precoding configuration information, the width of the frequency band for same precoding includes: determining, based on the width update parameter, the width of the frequency band for same precoding.

According to a third aspect, a transmit end device is provided, where the transmit end device includes:

a generation module, configured to generate precoding configuration information, where the precoding configuration information is used to configure a width of a frequency band for same precoding; and a sending module, configured to send the precoding configuration information.

In a possible design, the precoding configuration information includes a frequency bandwidth parameter, where the width of the frequency band for same precoding is equal to the frequency bandwidth parameter multiplied by reference frequency bandwidth.

The reference frequency bandwidth is equal to frequency bandwidth of a resource unit.

In a possible design, the precoding configuration information includes a width value of the frequency band for same precoding or an index of the width value.

In a possible design, the precoding configuration information includes an index of a width mapping rule, where the width mapping rule records a correspondence between system bandwidth and the width of the frequency band for same precoding.

In a possible design, the precoding configuration information includes a width update parameter, where the width update parameter is used to update a current width of the frequency band for same precoding.

According to a fourth aspect, a receive end device is provided, where the receive end device includes:

a receiving module, configured to receive precoding configuration information, where the precoding configuration information is used to configure a width of a frequency band for same precoding; and a determining module, configured to determine, based on the precoding configuration information, the width of the frequency band for same precoding.

In a possible design, the precoding configuration information includes a frequency bandwidth parameter; and the determining, based on the precoding configuration information, the width of the frequency band for same precoding includes that: the width of the frequency band for same precoding is equal to the frequency bandwidth parameter multiplied by reference frequency bandwidth.

The reference frequency bandwidth is equal to frequency bandwidth of a resource unit.

In a possible design, the precoding configuration information includes a width value of the frequency band for same precoding or an index of the width value; and the determining, based on the precoding configuration information, the width of the frequency band for same precoding includes: determining the width value of the frequency band for same precoding as the width of the frequency band for same precoding; or determining, based on a correspondence between an index of the width value of the frequency band for same precoding and the width value of the frequency band, the width of the frequency band for same precoding.

In a possible design, the precoding configuration information includes an index of a width mapping rule, where the width mapping rule of the frequency band for same precoding records a correspondence between system bandwidth and the width of the frequency band for same precoding; and the determining, based on the precoding configuration information, the width of the frequency band for same precoding includes: determining the width mapping rule based on the index of the width mapping rule, and then determining, based on the width mapping rule and the system bandwidth, the width of the frequency band for same precoding.

In a possible design, the precoding configuration information includes a width update parameter used to indicate the frequency band for same precoding; and the determining, based on the precoding configuration information, the width of the frequency band for same precoding includes: determining, based on the width update parameter, the width of the frequency band for same precoding.

According to a fifth aspect, a precoding configuration system is provided.

In a possible implementation, the precoding configuration system includes: the transmit end device according to any one of the third aspect or possible designs of the third aspect; and the receive end device according to any one of the fourth aspect or possible designs of the fourth aspect.

Beneficial effects brought by the technical solutions provided in the embodiments of the present disclosure are as follows:

According to the precoding configuration method, device, and system provided in the embodiments of the present disclosure, the transmit end device generates and sends the precoding configuration information, so that the receive end device can determine, based on the precoding configuration information, the width of the frequency band for same precoding. In the prior art, the width of the frequency band for same precoding is determined based on only system bandwidth, while the width of the frequency band for same precoding can be flexibly determined in the technical solutions provided in the embodiments of the present disclosure. Therefore, by using the technical solutions provided in the embodiments of the present disclosure, the transmit end device may feed back, to the receive end device based on specific requirements in different scenarios, an optimal width of a frequency band for same precoding, so that requirements of the wireless communications system may be met in diversified scenarios, and system performance may be effectively optimized in different scenarios.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DETAILED DESCRIPTION

In technical solutions provided in embodiments of the present disclosure, precoding configuration information is sent, so that a receive end can determine, based on the precoding configuration information, a width of a frequency band for same precoding. In the prior art, the width of the frequency band for same precoding is determined based on only system bandwidth, while the width of the frequency band for same precoding can be flexibly determined in the technical solutions provided in the embodiments of the present disclosure, so that requirements of a wireless communications system can be met in diversified scenarios, and system performance can be effectively optimized in different scenarios.

The following describes in detail the technical solutions provided in the embodiments of the present disclosure with reference to corresponding accompanying drawings.

Figure 1:
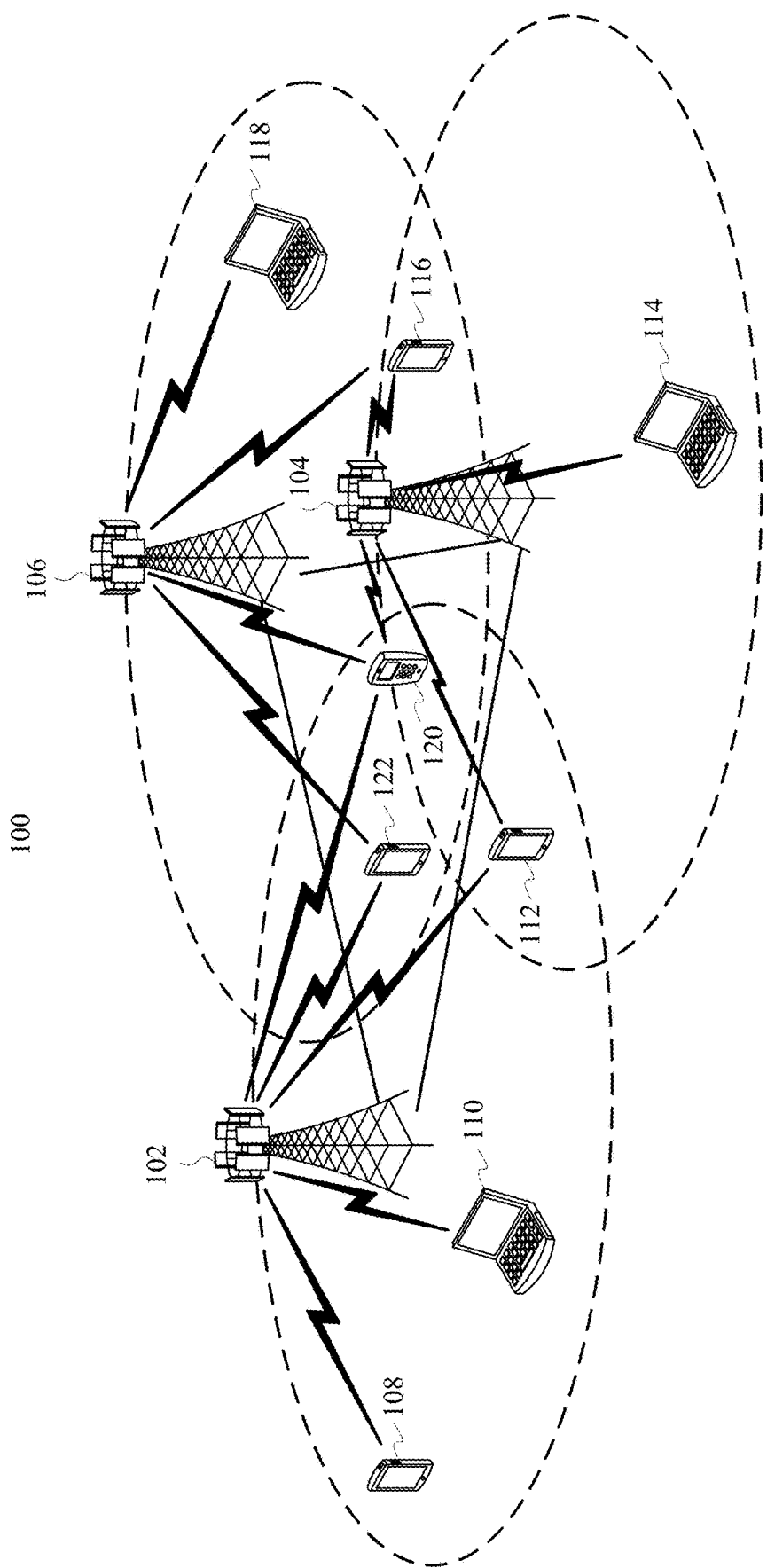
FIG. 1 is a schematic diagram of an example of a wireless communications network according to an embodiment of the present disclosure.

FIG. 1 is a schematic diagram of an example of a wireless communications network 100 according to an embodiment of the present disclosure. As shown in FIG. 1, the wireless communications network 100 includes base stations 102 to 106 and terminal devices 108 to 122. The base stations 102 to 106 may communicate with each other over a backhaul link (indicated by straight lines between the base stations 102 to 106). The backhaul link may be a wired backhaul link (for example, an optical fiber or a copper cable), or may be a wireless backhaul link (for example, microwave). The terminal devices 108 to 122 may communicate with the corresponding base stations 102 to 106 over radio links (indicated by polygonal lines between the base stations 102 to 106 and the terminal devices 108 to 122).

The base stations 102 to 106 are configured to provide a wireless access service for the terminal devices 108 to 122. Specifically, each base station corresponds to one service coverage area (which may also be referred to as a cell, and is indicated by each elliptical area in FIG. 1). A terminal device that enters the area may communicate with the base station by using a radio signal, to receive a wireless access service provided by the base station. Service coverage areas of base stations may overlap, and a terminal device in an overlapping area may receive radio signals from a plurality of base stations. Therefore, the plurality of base stations may all serve the terminal device. For example, the plurality of base stations may serve the terminal device in the overlapping area by using a coordinated multipoint (CoMP) technology. For example, as shown in FIG. 1, there is an overlapping area between a service coverage area of the base station 102 and a service coverage area of the base station 104, and the terminal device 112 is located in the overlapping area. Therefore, the terminal device 112 may receive radio signals from the base station 102 and the base station 104, and the base station 102 and the base station 104 may both serve the terminal device 112. For another example, as shown in FIG. 1, there is a common overlapping area among the service coverage area of the base station 102, the service coverage area of the base station 104, and a service coverage area of the base station 106, and the terminal device 120 is located in the overlapping area. Therefore, the terminal device 120 may receive radio signals from the base stations 102, 104, and 106, and the base stations 102, 104, and 106 may all serve the terminal device 120.

Depending on a used wireless communications technology, the base station may also be referred to as a NodeB, an evolved NodeB (eNodeB), an access point (AP), or the like. In addition, depending on sizes of coverage areas of services provided by base stations, the base stations may alternatively be classified into a macro base station configured to provide a macro cell, a micro base station configured to provide a micro or pico cell, and a femto base station configured to provide a femto cell. With continuous evolution of wireless communications technologies, a future base station may have another name.

The terminal devices 108 to 118 may be various wireless communications devices having a wireless communication function, for example but not limited to, a mobile cellular phone, a cordless phone, a personal digital assistant (PDA), a smartphone, a notebook computer, a tablet computer, a wireless data card, a wireless modem, and a wearable device, such as a smartwatch. With rise of the Internet of Things (IOT) technology, an increasing quantity of devices that previously do not have a communication function, for example but not limited to, household appliances, transportation equipment, tools, service devices, and service facilities, begin to obtain the wireless communication function by disposing a wireless communications unit, so that the devices access a wireless communications network and are remotely controlled. Such devices have the wireless communication function because the wireless communications unit is disposed on the devices, and therefore also fall within a scope of wireless communications devices. In addition, each of the terminal devices 108 to 118 may also be referred to as a mobile station, a mobile device, a mobile terminal, a wireless terminal, a handheld device, a client, or the like.

A plurality of antennas may be disposed on all the base stations 102 to 106 and the terminal devices 108 to 122, to support a MIMO technology. Further, the terminal devices 108 to 122 may support not only a single user MIMO (SU-MIMO) technology but also multi-user MIMO (MU-MIMO). The MU-MIMO may be implemented based on a space division multiple access (SDMA) technology. Because the plurality of antennas are disposed on the base stations 102 to 106 and the terminal devices 108 to 122, the base stations 102 to 106 and the terminal devices 108 to 122 may further flexibly support a single-input single-output (SISO) technology, a single-input multiple-output (SIMO) technology, and a multiple-input-single-output (MISO) technology, to implement various diversity (for example but not limited to, transmit diversity and receive diversity) and multiplexing technologies. The diversity technologies may include, for example but not limited to, a transmit diversity (TD) technology and a receive diversity (RD) technology. The multiplexing technology may be a spatial multiplexing technology. In addition, the foregoing technologies may further include a plurality of implementation solutions. For example, currently frequently-used transmit diversity may include diversity manners, for example but not limited to, space time transmit diversity (STTD), space-frequency transmit diversity (SFTD), time switched transmit diversity (TSTD), frequency switched transmit diversity (FSTD), orthogonal transmit diversity (OTD), and cyclic delay diversity (CDD), and diversity manners obtained after derivation, evolution, and combination of the foregoing diversity manners. For example, in a current Long Term Evolution (LTE) standard, transmit diversity manners such as space time block coding (STBC), space frequency block coding (SFBC), and the CDD are used.

In addition, the base station 102 may communicate with the terminal devices 104 to 110 by using various wireless communications technologies, for example but not limited to, a Time Division Multiple Access (TDMA) technology, a Frequency Division Multiple Access (FDMA) technology, a Code Division Multiple Access (CDMA) technology, a Time Division-Synchronous Code Division Multiple Access (TD-SCDMA) technology, an orthogonal frequency division multiple access (OFDMA) technology, a single carrier frequency division multiple access (SC-FDMA) technology, a space division multiple access (SDMA) technology, and technologies evolved and derived from these technologies. The foregoing wireless communications technologies are adopted as a radio access technology (Radio Access Technology, RAT) in numerous wireless communications standards, to construct various wireless communications systems (or networks) nowadays widely known to people, including but not limited to Global System for Mobile Communications (GSM), CDMA2000, Wideband CDMA (WCDMA), Wi-Fi defined in the 802.11 series standard, Worldwide Interoperability for Microwave Access (WiMAX), LTE-Advanced (LTE-A), and systems evolved from these wireless communications systems. The wireless communications network shown in FIG. 1 may be any system or network in the foregoing wireless communications systems. Unless otherwise specified, the technical solutions provided in the embodiments of the present disclosure may be applied to the foregoing wireless communications technologies and wireless communications systems. In addition, the terms "system" and "network" may be interchanged with each other.

It should be noted that, the wireless communications network 100 shown in FIG. 1 is only an example, and is not intended to limit the technical solutions of the present disclosure. A person skilled in the art should understand that, in a specific implementation process, the wireless communications network 100 further includes another device, for example but not limited to, a base station controller (BSC), and a quantity of base stations and a quantity of terminal devices may be set based on a specific requirement.

Figure 2:
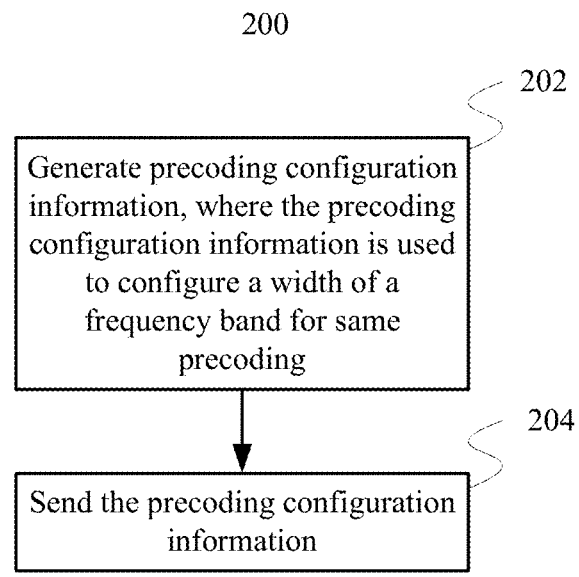
FIG. 2 is a schematic diagram of an example of a precoding configuration method according to an embodiment of the present disclosure.

FIG. 2 is a flowchart of an example of a precoding configuration method 200 according to an embodiment of the present disclosure. In a specific implementation process, the method 200 may be performed by a transmit end device. The transmit end device may be, for example but not limited to, one of the terminal devices 108 to 122 or the base stations 102 to 106 in FIG. 1.

Step 202: Generate precoding configuration information, where the precoding configuration information is used to configure a width of a frequency band for same precoding.

Step 204: Send the precoding configuration information.

The same precoding in the method 200 refers to a process in which a same precoding matrix is used for precoding. To facilitate understanding of the width of the frequency band for same precoding, the existing LTE standard is used as an example to introduce this concept. In an LTE system, a physical resource block group (PRG) is used to indicate the width of the frequency band for same precoding. The width of the frequency band for same precoding in the method 200 is similar to that in the LTE system.

In the method 200, the precoding configuration information may include a frequency bandwidth parameter. In this case, the width that is indicated by the precoding configuration information and that is of the frequency band for same precoding is equal to the frequency bandwidth parameter multiplied by reference frequency bandwidth. Optionally, the reference frequency bandwidth is equal to frequency bandwidth of a resource unit. The resource unit may be a resource block (RB) in the LTE standard, or may be a newly defined unit similar to the RB. In addition, the frequency bandwidth parameter may be a specific value. For example, the frequency bandwidth parameter is a value of 3, and the resource unit is represented as an RB in the LTE standard. Then the width that is indicated by the precoding configuration information and that is of the frequency band for same precoding is frequency bandwidth of three RBs. To be specific, the width of the frequency band for same precoding is 540 kHz (3×12×15 kHz). It should be noted that in a specific implementation process, the reference frequency bandwidth may alternatively be another width, for example but not limited to, subcarrier spacing.

Preferably, in the method 200, the precoding configuration information may further include a width value of the frequency band for same precoding or an index of the width value. The width value or the index of the width value is used to determine the width of the frequency band for same precoding. For example, the precoding configuration information generated by the transmit end device carries a specific width value used to indicate the width of the frequency band for same precoding. For example, the width value may be 180 kHz, and the width value 180 kHz is a width of a frequency band for same precoding that is indicated by the transmit end device to a receive end device and that is optimal in a specific scenario. The mentioned scenario may be a high frequency scenario (with a carrier frequency greater than 6 GHz), a low frequency scenario (with a carrier frequency less than 6 GHz), or the like, and the scenario may be configured based on a specific requirement, and is not limited herein. For another example, the precoding configuration information generated by the transmit end device carries an index used to indicate a width value of a frequency band for same precoding. After receiving the index, the receive end device can determine, based on a correspondence between the width value and the index that is agreed in advance, an optimal width that is indicated by the transmit end device to the receive end device and that is of the frequency band for same precoding. Specifically, for the correspondence between the width value and the index, refer to Table 1 below.

TABLE 1

| Index | Width |
|---|---|
| 0 | 180 kHz |
| 1 | 360 kHz |
| 2 | 720 kHz |
| 3 | 1080 kHz |

Preferably, in the method 200, the precoding configuration information may further include an index of a width mapping rule. The width mapping rule records a correspondence between system bandwidth and the width of the frequency band for same precoding. The index of the width mapping rule is used to indicate the width mapping rule. In this case, the receive end device may determine, based on the width mapping rule and the system bandwidth, the width of the frequency band for same precoding. For example, the precoding configuration information generated by the transmit end device carries an index used to indicate a width mapping rule, and the width mapping rule is determined by using the index. The mapping rule may be expressed in a form of a table, or may be expressed in another form. The LTE standard is used as an example. For the form of a table, refer to Table 2 below (for ease of description, the index is represented as idx, the width of the frequency band for same precoding is represented as P, and the frequency bandwidth is expressed in a quantity of physical resource blocks PRBs in the prior art). The correspondence between the system bandwidth and the width of the frequency band for same precoding is determined based on a value of the index idx. For example, a value of idx is 0, the system bandwidth is 11 PRBs to 26 PRBs, and P is equal to two PRBs, namely, 360 kHz.

TABLE 2

| System bandwidth | P (PRBs) | |
|---|---|---|
| ($N_{RB}^{DL}$) | idx = 0 | idx = 1 |
| ≤10 | 1 | 2 |
| 11-26 | 2 | 3 |
| 27-63 | 3 | 4 |
| 64-110 | 2 | 4 |

Preferably, in the method 200, the precoding configuration information may further include a width update parameter. The width update parameter is used to update a current width of the frequency band for same precoding. For example, precoding configuration information generated by the transmit end device carries a width update parameter, and the width update parameter is used to indicate a required update on the current width of the frequency band for same precoding. Specific update content may be expressed in a form of a calculation formula. For details, refer to Table 3 below (for ease of description, the width update parameter is represented as CASE, the current width of the frequency band for same precoding is represented as P, an updated width of the frequency band is represented as P*, and the frequency bandwidth is expressed in a quantity of physical resource blocks PRBs in the prior art). An updated width that is corresponding to the system bandwidth and that is of the frequency band for same precoding is determined based on a value of the width update parameter CASE (for example, the value of CASE is 0 or 1).

TABLE 3

| System bandwidth | P* (PRBs) | |
|---|---|---|
| ($N_{RB}^{DL}$) | Case 0 | Case 1 |
| ≤10 | P* = P + 1 | P* = P − 1 |
| 11-26 | P* = P + 2 | P* = P |
| 27-63 | P* = P × 2 | P* = P/2 |
| 64-110 | P* = P | P* = P |

In a specific implementation process, in step 204, the transmit end device sends the foregoing precoding configuration information to the receive end device by using a determined resource. The precoding configuration information may be sent by using one of the following types of signaling:

physical layer signaling;
media access control layer signaling; and
radio resource control signaling.

The physical layer signaling is also referred to as Layer 1 (L1) signaling, and may usually be carried in a control portion of a physical layer frame. A typical example of the L1 signaling is downlink control information (DCI) carried in a physical downlink control channel (PDCCH) defined in the LTE standard. In some cases, the L1 signaling may alternatively be carried in a data portion of the physical layer frame. It can be easily learned that, a transmission period or a signaling period of the L1 signaling is usually a period of the physical layer frame. Therefore, such signaling is usually used to implement some dynamic control, to transmit some frequently changing information. For example, the physical layer signaling may be used to transfer resource allocation information.

The media access control (MAC) layer signaling belongs to Layer 2 (L2) signaling, and may usually be carried in, for example but not limited to, a frame header of a Layer 2 frame. The frame header may further carry information, for example but not limited to, information such as a source address and a destination address. The Layer 2 frame usually further includes a frame body, in addition to the frame header. In some cases, the L2 signaling may alternatively be carried in the frame body of the Layer 2 frame. A typical example of the Layer 2 signaling is signaling carried in a frame control field a frame header of a MAC frame in the 802.11 series standard, or a MAC control entity defined in some protocols. The Layer 2 frame may usually be carried in the data portion of the physical layer frame. The precoding configuration information may alternatively be sent by using another type of Layer 2 signaling other than the media access control layer signaling.

The radio resource control (RRC) signaling belongs to Layer 3 (L3) signaling, and is usually some control messages. The L3 signaling may usually be carried in the frame body of a Layer 2 frame. The L3 signaling usually has a relatively long transmission period or control period, and is suitable for sending some information that does not frequently change. For example, in some existing communications standards, the L3 signaling is usually used to carry some configuration information. The precoding configuration information may alternatively be sent by using another type of Layer 3 signaling other than the RRC signaling.

The foregoing is merely principle description of the physical layer signaling, the MAC layer signaling, the RRC signaling, the Layer 1 signaling, the Layer 2 signaling, and the Layer 3 signaling. For details about the three types of signaling, refer to the prior art. Therefore, details are not described in this specification.

It can be easily learned that, the precoding configuration information is sent by using signaling, so that a receive end can determine, based on the precoding configuration information, the width of the frequency band for same precoding. In the prior art, the width of the frequency band for same precoding is determined based on only the system bandwidth, while the width of the frequency band for same precoding can be flexibly determined in the technical solutions provided in the embodiments of the present disclosure. Therefore, by using the technical solutions provided in the embodiments of the present disclosure, the transmit end device feeds back, to the receive end device based on a specific requirement in a different scenario, an optimal width of a frequency band for same precoding, so that requirements of the wireless communications system can be met in diversified scenarios, and system performance can be effectively optimized in different scenarios.

Figure 3:
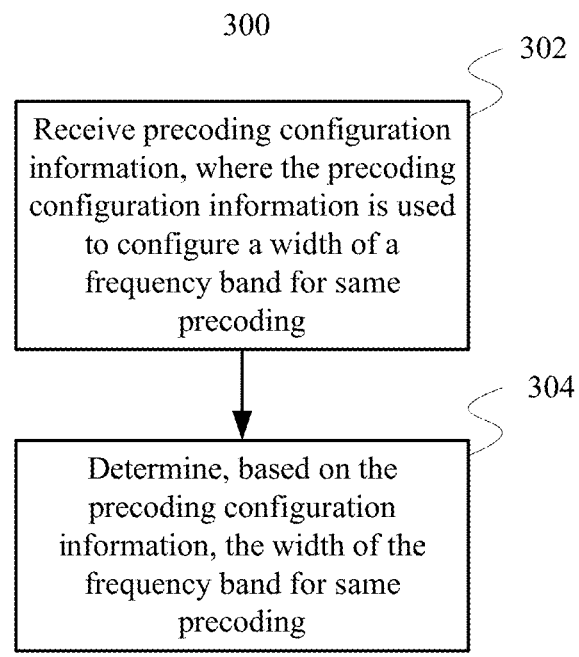
FIG. 3 is a flowchart of an example of a precoding configuration method according to an embodiment of the present disclosure.

FIG. 3 is a flowchart of an example of a precoding configuration method 300 according to an embodiment of the present disclosure. In a specific implementation process, the method 300 may be performed by a receive end device. The receive end device may be, for example but not limited to, one of the base stations 102 to 106 or the terminal devices 108 to 122 in FIG. 1.

Step 302: Receive precoding configuration information, where the precoding configuration information is used to configure a width of a frequency band for same precoding.

Step 304: Determine, based on the precoding configuration information, the width of the frequency band for same precoding.

Concepts and other related features of the width of the frequency band for same precoding and the frequency bandwidth of the resource unit are described in detail in the method 200. Details are not described herein again.

In the method 300, the precoding configuration information may include a frequency bandwidth parameter, the width of the frequency band for same precoding is determined based on the frequency bandwidth parameter, and the width of the frequency band for same precoding is equal to the frequency bandwidth parameter multiplied by reference frequency bandwidth. A specific determining process of the width of the frequency band for same precoding is described in detail in the method 200. Details are not described herein again.

Preferably, in the method 300, the precoding configuration information may further include a width value of the frequency band for same precoding or an index of the width value. The width of the frequency band for same precoding is determined based on the width value or the index of the width value. For example, the receive end device receives a specific width value. For example, the width value may be 180 kHz. In this case, the width value 180 kHz is a width of a frequency band for same precoding that is indicated by the transmit end device to the receive end device and that is optimal in a specific scenario. The mentioned scenario may be a high frequency scenario (with a carrier frequency greater than 6 GHz), a low frequency scenario (with a carrier frequency less than 6 GHz), or the like, and the scenario may be configured based on a specific requirement, and is not limited herein. For another example, the receive end device receives an index used to indicate a width value of a frequency band for same precoding. In this case, after receiving the index, the receive end device can determine, based on a correspondence between the width value and the index that is agreed in advance, an optimal width that is indicated by the transmit end device to the receive end device and that is of the frequency band for same precoding. Specifically, for the correspondence between the width value and the index, refer to Table 1 in the method 200. For example, an index is equal to 1, and a corresponding width value of the index is 360 kHz. In other words, the optimal width that is indicated by the transmit end device to the receive end device and that is of the frequency band for same precoding is 360 kHz.

Preferably, in the method 300, the precoding configuration information may further include an index of a width mapping rule. The width mapping rule records a correspondence between system bandwidth and the width of the frequency band for same precoding. The index of the width mapping rule is used to indicate the width mapping rule. In this case, the receive end device may determine, based on the width mapping rule and the system bandwidth, the width of the frequency band for same precoding. For example, the receive end device receives an index used to indicate a width mapping rule, and the width mapping rule is determined by using the index. The mapping rule may be expressed in a form of a table, or may be expressed in another form. The LTE standard is used as an example. For the form of a table, refer to Table 2 in the method 200 (for ease of description, the index is represented as idx, the width of the frequency band for same precoding is represented as P, and the frequency bandwidth is expressed in a quantity of physical resource blocks (PRBs) in the prior art). The correspondence between the system bandwidth and the width of the frequency band for same precoding is determined based on a value of the index idx. For example, a value of idx is 0, the system bandwidth is 11 PRBs to 26 PRBs, and the width of the frequency band for same precoding is equal to two PRBs, namely, 360 kHz. In other words, in this case, the width that is indicated by the transmit end device to the receive end device and that is of the frequency band for same precoding is 360 kHz.

Preferably, in the method 300, the precoding configuration information may further include a width update parameter, and the width of the frequency band for same precoding is determined based on the width update parameter. For example, the receive end device receives a width update parameter, and the width update parameter is used to indicate a required update on the current width of the frequency band for same precoding. Specific update content may be expressed in a form of a calculation formula. For details, refer to Table 3 in the method 200 (for ease of description, the width update parameter is represented as CASE, the current width of the frequency band for same precoding is represented as P, an updated width of the frequency band is represented as P*, and the frequency bandwidth is expressed in a quantity of physical resource blocks (PRBs) in the prior art). An updated width that is corresponding to the system bandwidth and that is of the frequency band for same precoding is determined based on a value of the width update parameter CASE. For example, when a value of CASE is 0 and the system bandwidth is set to 27 PRBs to 63 PRBs, a calculation formula used for the update content is P*=P×2. To be specific, when the width of the frequency band for same precoding is two PRBs, a width that is updated by the receive end device and that is of the frequency band for same precoding is four PRBs. For example, when a value of CASE is 1 and the system bandwidth is 64 PRBs to 110 PRBs, a calculation formula used for the update content is P*=P. To be specific, when the width of the frequency band for same precoding is two PRBs, a width that is updated by the receive end device and that is of the frequency band for same precoding is also two PRBs.

It can be learned that the receive end device may determine, based on the precoding configuration information sent by the transmit end device, the width of the frequency band for same precoding. In the prior art, the width of the frequency band for same precoding is determined based on only the system bandwidth, while the width of the frequency band for same precoding can be flexibly determined in the technical solutions provided in the embodiments of the present disclosure. Therefore, by using the technical solutions provided in the embodiments of the present disclosure, the receive end device receives precoding configuration information sent by the transmit end device based on different scenarios, to determine the width of the frequency band for same precoding, so that requirements of the wireless communications system can be met in diversified scenarios, and system performance can be effectively optimized in different scenarios.

Figure 4:
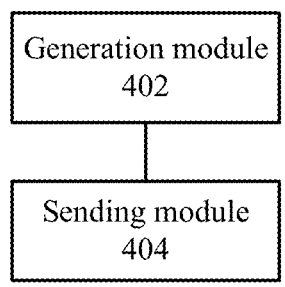
FIG. 4 is a schematic diagram of a logical structure of a transmit end device according to an embodiment of the present disclosure.

FIG. 4 is a schematic diagram of a logical structure of a transmit end device 400 according to an embodiment of the present disclosure. In a specific implementation process, the transmit end device may be, for example but not limited to, one of the terminal devices 108 to 122 or the base stations 102 to 106 in FIG. 1. As shown in FIG. 4, the device 400 includes a generation module 402 and a sending module 404.

The generation module 402 is configured to generate precoding configuration information, where the precoding configuration information is used to configure a width of a frequency band for same precoding.

The sending module 404 is configured to send the precoding configuration information.

The precoding configuration information may include a frequency bandwidth parameter, where the width of the frequency band for same precoding is equal to the frequency bandwidth parameter multiplied by reference frequency bandwidth, and the reference frequency bandwidth is equal to frequency bandwidth of a resource unit.

Preferably, the precoding configuration information may further include a width value of the frequency band for same precoding or an index of the width value, where the width value or the index of the width value is used to determine the width of the frequency band for same precoding.

Preferably, the precoding configuration information may further include an index of a width mapping rule, where the width mapping rule records a correspondence between system bandwidth and the width of the frequency band for same precoding, and the index of the width mapping rule is used to determine the width mapping rule.

Preferably, the precoding configuration information may further include a width update parameter, where the width update parameter is used to update a current width of the frequency band for same precoding.

The device 400 is configured to perform the method 200 shown in FIG. 2. Technical features related to the device 400 are described above in detail with reference to the accompanying drawings, for example but not limited to, FIG. 2. Therefore, details are not described herein again.

Figure 5:
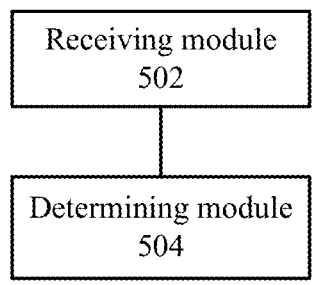
FIG. 5 is a schematic diagram of a logical structure of a receive end device according to an embodiment of the present disclosure.

FIG. 5 is a schematic diagram of a logical structure of a receive end device 500 according to an embodiment of the present disclosure. In a specific implementation process, the receive end device may be, for example but not limited to, one of the base stations 102 to 106 or the terminal devices 108 to 122 in FIG. 1. As shown in FIG. 5, the device 500 includes a receiving module 502 and a determining module 504.

The receiving module 502 is configured to receive precoding configuration information, where the precoding configuration information is used to configure a width of a frequency band for same precoding.

The determining module 504 is configured to determine, based on the precoding configuration information, the width of the frequency band for same precoding.

The precoding configuration information may include a frequency bandwidth parameter, and the width of the frequency band for same precoding is determined based on the frequency bandwidth parameter. The width of the frequency band for same precoding is equal to the frequency bandwidth parameter multiplied by reference frequency bandwidth, and the reference frequency bandwidth is equal to frequency bandwidth of a resource unit.

Preferably, the precoding configuration information may further include a width value of the frequency band for same precoding or an index of the width value, and the width value or the index of the width value is used to determine the width of the frequency band for same precoding.

Preferably, the precoding configuration information may further include an index of a width mapping rule, the width mapping rule records a correspondence between system bandwidth and the width of the frequency band for same precoding, and the width of the frequency band for same precoding is determined based on the width mapping rule and the system bandwidth.

Preferably, the precoding configuration information may further include a width update parameter, and the width of the frequency band for same precoding is determined based on the width update parameter.

The device 500 is a receive side device corresponding to the device 400, and is configured to perform the method 300 shown in FIG. 3. Technical features related to the device 500 are described above in detail with reference to the accompanying drawings, for example but not limited to, FIG. 3. Therefore, details are not described herein again.

Figure 6:
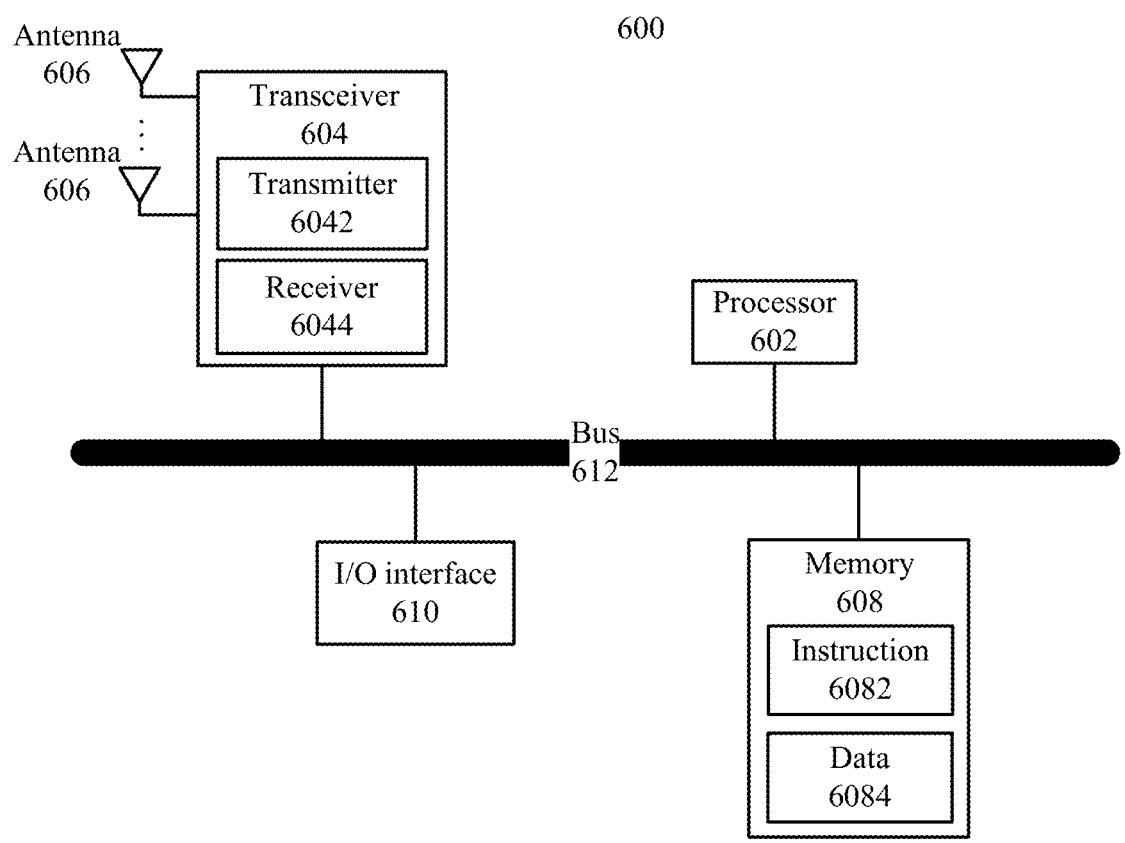
FIG. 6 is a schematic diagram of a hardware structure of a transmit end device according to an embodiment of the present disclosure.

FIG. 6 is a schematic diagram of a hardware structure of a transmit end device 600 according to an embodiment of the present disclosure. As shown in FIG. 6, the device 600 includes a processor 602, a transceiver 604, a plurality of antennas 606, a memory 608, an I/O (input/output) interface 610, and a bus 612. The transceiver 604 further includes a transmitter 6042 and a receiver 6044. The memory 608 is further configured to store an instruction 6082 and data 6084. In addition, the processor 602, the transceiver 604, the memory 608, and the I/O interface 610 are communicatively connected to each other by using the bus 612. The plurality of antennas 606 are connected to the transceiver 604.

The processor 602 may be a general purpose processor, for example but not limited to, a central processing unit (CPU), or may be a dedicated processor, for example but not limited to, a digital signal processor (DSP), an application-specific integrated circuit (ASIC), or a field programmable gate array (FPGA). In addition, the processor 602 may alternatively be a combination of a plurality of processors. Specifically, in the technical solutions provided in the embodiments of the present disclosure, the processor 602 may be configured to perform, for example, step 202 in the precoding configuration method 200 shown in FIG. 2 and the operation performed by the generation module 402 in the transmit end device 400 shown in FIG. 4. The processor 602 may be a processor specifically designed to perform the foregoing step and/or operation, or may be a processor that is configured to perform the foregoing step and/or operation by reading and executing the instruction 6062 stored in the memory 608. The processor 602 may need to use the data 6084 when performing the foregoing step and/or operation.

The transceiver 604 includes the transmitter 6042 and the receiver 6044. The transmitter 6042 is configured to send a signal by using at least one of the plurality of antennas 606. The receiver 6044 is configured to receive a signal by using at least one of the plurality of antennas 606. Specifically, in the technical solutions provided in the embodiments of the present disclosure, the processor 6042 may be specifically configured to perform, by using at least one of the plurality of antennas 606, for example, step 204 in the precoding configuration method 200 shown in FIG. 2 and the operation performed by the sending module 404 in the transmit end device 400 shown in FIG. 4.

The memory 608 may be one of various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 608 is specifically configured to store the instruction 6082 and the data 6084. The processor 602 may perform the foregoing step and/or operation by reading and executing the instruction 6082 stored in the memory 608, and may need to use the data 6084 when performing the foregoing step and/or operation.

The I/O interface 610 is configured to receive an instruction and/or data from a peripheral device, and output an instruction and/or data to the peripheral device.

It should be noted that in a specific implementation process, the device 600 may further include other hardware devices. No further examples are enumerated in this specification.

Figure 7:
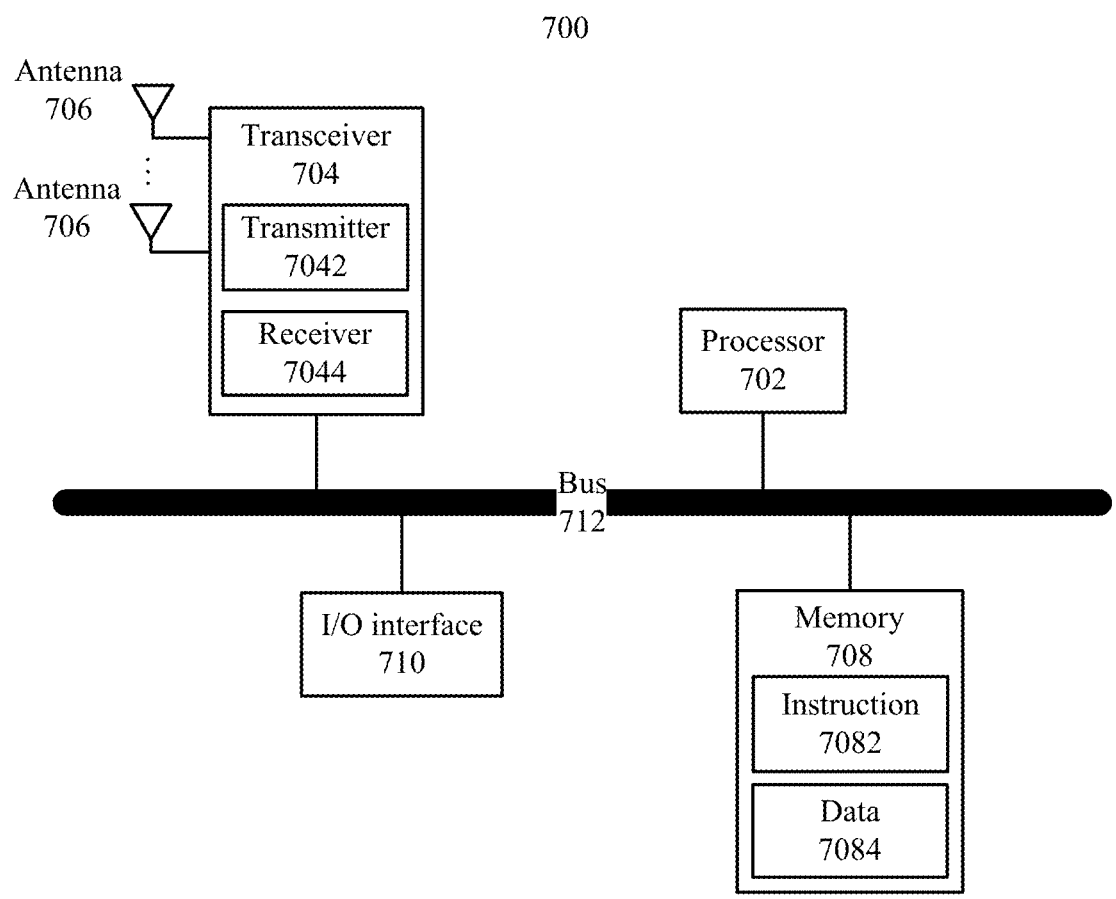
FIG. 7 is a schematic diagram of a hardware structure of a receive end device according to an embodiment of the present disclosure.

FIG. 7 is a schematic diagram of a hardware structure of a receive end device 700 according to an embodiment of the present disclosure. As shown in FIG. 7, the device 700 includes a processor 702, a transceiver 704, a plurality of antennas 706, a memory 708, an I/O (input/output) interface 710, and a bus 712. The transceiver 704 further includes a transmitter 7042 and a receiver 7044. The memory 708 is further configured to store an instruction 7082 and data 7084. In addition, the processor 702, the transceiver 704, the memory 708, and the I/O interface 710 are communicatively connected to each other by using the bus 712. The plurality of antennas 706 are connected to the transceiver 704.

The processor 702 may be a general purpose processor, for example but not limited to, a central processing unit (CPU), or may be a dedicated processor, for example but not limited to, a digital signal processor (DSP), an application-specific integrated circuit (ASIC), or a field programmable gate array (FPGA). In addition, the processor 702 may alternatively be a combination of a plurality of processors. Specifically, in the technical solutions provided in the embodiments of the present disclosure, the processor 702 is configured to perform, for example, step 304 in the method 300 for receiving precoding configuration information shown in FIG. 3 and the operation performed by the determining module 504 in the device 500 for receiving precoding configuration information shown in FIG. 5. The processor 702 may be a processor specifically designed to perform the foregoing step and/or operation, or may be a processor that is configured to perform the foregoing step and/or operation by reading and executing the instruction 7082 stored in the memory 708. The processor 702 may need to use the data 7084 when performing the foregoing step and/or operation.

The transceiver 704 includes the transmitter 7042 and the receiver 7044. The transmitter 7042 is configured to send a signal by using at least one of the plurality of antennas 706. The receiver 7044 is configured to receive a signal by using at least one of the plurality of antennas 706. Specifically, in the technical solutions provided in the embodiments of the present disclosure, the receiver 7044 may be specifically configured to perform, by using at least one of the plurality of antennas 706, for example, step 302 in the precoding configuration method 300 shown in FIG. 3 and the operation performed by the receiving module 502 in the receive end device 500 shown in FIG. 5.

The memory 708 may be one of various types of storage media, for example, a random access memory (RAM), a read-only memory (ROM), a non-volatile RAM (NVRAM), a programmable ROM (PROM), an erasable PROM (EPROM), an electrically erasable PROM (EEEPROM), a flash memory, an optical memory, and a register. The memory 708 is specifically configured to store the instruction 7082 and the data 7084. The processor 702 may perform the foregoing step and/or operation by reading and executing the instruction 7082 stored in the memory 708, and may need to use the data 7084 when performing the foregoing step and/or operation.

The I/O interface 710 is configured to receive an instruction and/or data from a peripheral device, and output an instruction and/or data to the peripheral device.

It should be noted that in a specific implementation process, the device 700 may further include other hardware devices. No further examples are enumerated in this specification.

Figure 8:
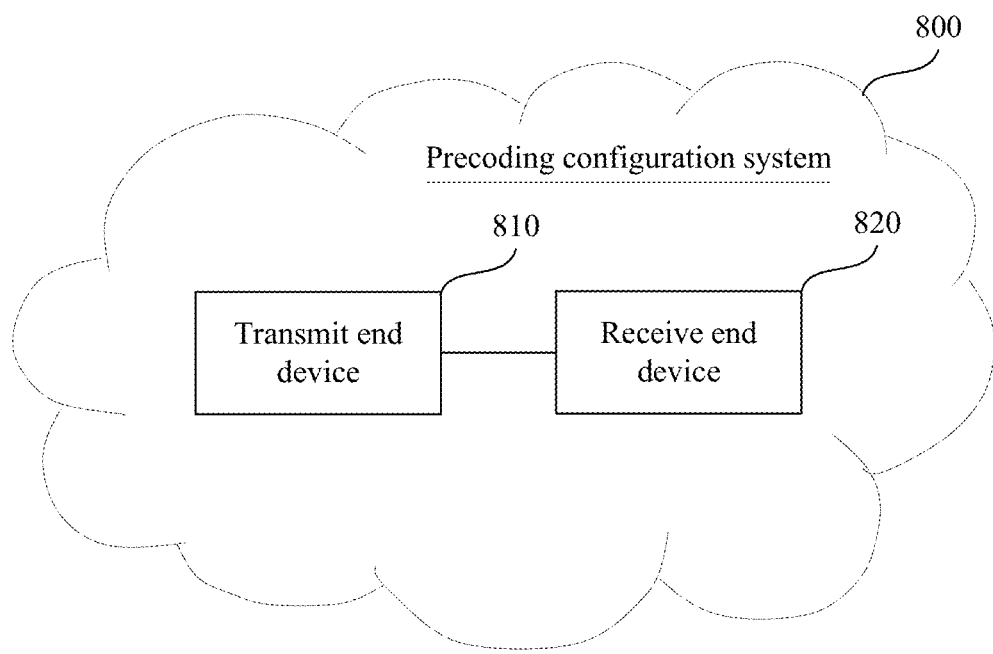
FIG. 8 is a schematic structural diagram of a precoding configuration system according to an embodiment of the present disclosure.

FIG. 8 is a schematic structural diagram of a precoding configuration system 800 according to an embodiment of the present disclosure. In a specific implementation process, as shown in FIG. 8, the precoding configuration system 800 may include a transmit end device 810 and a receive end device 820.

In a possible implementation, the transmit end device 810 is the transmit end device 400 shown in FIG. 4, and the receive end device 820 is the receive end device 500 shown in FIG. 5.

In another possible implementation, the transmit end device 810 is the transmit end device 600 shown in FIG. 6, and the receive end device 820 is the receive end device 700 shown in FIG. 7.

The foregoing descriptions are merely example embodiments of the present disclosure, but are not intended to limit the present disclosure. Any modification, equivalent replacement, improvement and the like made without departing from the spirit and principle of the present disclosure shall fall within the protection scope of the present disclosure. For example, other processing steps are added before, between, and/or after the steps of the methods provided in the embodiments of the present disclosure, and other processing modules are added into the apparatuses provided in the embodiments of the present disclosure to complete additional processing. Any application of the technical solutions provided in the embodiments of the present disclosure in a specific scenario or a specific condition shall be considered as further improvement made based on the technical solutions provided in the embodiments of the present disclosure, thereby falling within the scope of the present disclosure.

It should be understood that sequence numbers of the foregoing processes do not mean execution sequences in the embodiments of the present disclosure. The execution sequences of the processes should be determined based on functions and internal logic of the processes, and should not be construed as any limitation on the implementation processes of the embodiments of the present disclosure.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on specific applications and design constraint conditions of the technical solutions. A person skilled in the art may use different methods to implement the described functions for each specific application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented electrically, mechanically or in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A precoding configuration method, comprising:
   generating precoding configuration information for configuring a width of a frequency band for same precoding; and
   sending the precoding configuration information, wherein the precoding configuration information comprises a frequency bandwidth parameter and the width of the frequency band for same precoding is equal to the frequency bandwidth parameter multiplied by reference frequency bandwidth.

2. The method according to claim 1, wherein the reference frequency bandwidth is equal to frequency bandwidth of a resource unit.

3. The method according to claim 1, wherein the precoding configuration information comprises a width value of the frequency band for same precoding or an index of the width value.

4. The method according to claim 1, wherein the precoding configuration information comprises an index of a width mapping rule, wherein the width mapping rule records a correspondence between system bandwidth and the width of the frequency band for same precoding.

5. The method according to claim 1, wherein the precoding configuration information comprises a width update parameter for updating a current width of the frequency band for same precoding.

6. A precoding configuration method, comprising:
   receiving precoding configuration information for configuring a width of a frequency band for same precoding; and
   determining, based on the precoding configuration information, the width of the frequency band for same precoding, wherein the precoding configuration information comprises a frequency bandwidth parameter; and the determined width of the frequency band for same precoding is equal to the frequency bandwidth parameter multiplied by reference frequency bandwidth.

7. The method according to claim 6, wherein the reference frequency bandwidth is equal to frequency bandwidth of a resource unit.

8. The method according to claim 6, wherein:
   the precoding configuration information comprises a width value of the frequency band for same precoding or an index of the width value; and
   determining, based on the precoding configuration information, the width of the frequency band for same precoding comprises:
   determining the width value of the frequency band for same precoding as the width of the frequency band for same precoding, or
   determining, based on a correspondence between an index of the width value of the frequency band for same precoding and the width value of the frequency band, the width of the frequency band for same precoding.

9. The method according to claim 6, wherein:
   the precoding configuration information comprises an index of a width mapping rule, and the width mapping rule records a correspondence between system bandwidth and the width of the frequency band for same precoding; and determining, based on the precoding configuration information, the width of the frequency band for same precoding comprises:

determining the width mapping rule based on the index of the width mapping rule, and determining, based on the width mapping rule and the system bandwidth, the width of the frequency band for same precoding.

10. The method according to claim 6, wherein:

the precoding configuration information comprises a width update parameter; and determining, based on the precoding configuration information, the width of the frequency band for same precoding comprises:

determining, based on the width update parameter, the width of the frequency band for same precoding.

11. A transmit end device, comprising:

a processor configured to generate precoding configuration information for configuring a width of a frequency band for same precoding; and a transmitter configured to send the precoding configuration information, wherein the precoding configuration information comprises a frequency bandwidth parameter and the width of the frequency band for same precoding is equal to the frequency bandwidth parameter multiplied by reference frequency bandwidth.

12. The transmit end device according to claim 11, wherein the reference frequency bandwidth is equal to frequency bandwidth of a resource unit.

13. The transmit end device according to claim 11, wherein the precoding configuration information comprises a width value of the frequency band for same precoding or an index of the width value.

14. The transmit end device according to claim 11, wherein the precoding configuration information comprises an index of a width mapping rule, and the width mapping rule records a correspondence between system bandwidth and the width of the frequency band for same precoding.

15. The transmit end device according to claim 11, wherein the precoding configuration information comprises a width update parameter for updating a current width of the frequency band for same precoding.

* * * * *

UNITED STATES PATENT AND TRADEMARK OFFICE
CERTIFICATE OF CORRECTION

Page 1 of 1

PATENT NO. : 10,972,159 B2
APPLICATION NO. : 16/401824
DATED : April 6, 2021
INVENTOR(S) : Rong et al.

It is certified that error appears in the above-identified patent and that said Letters Patent is hereby corrected as shown below:

On the Title Page

Item (56), Other Publications, Citation 1:
"Project;Technicai Specification Group Radio Access Network;Evolved"
Should read:
-- Project;Technical Specification Group Radio Access Network;Evolved --.

Signed and Sealed this
Nineteenth Day of April, 2022

Katherine Kelly Vidal
*Director of the United States Patent and Trademark Office*